(12) United States Patent
Rahmes et al.

(10) Patent No.: US 7,760,913 B2
(45) Date of Patent: Jul. 20, 2010

(54) GEOSPATIAL MODELING SYSTEM PROVIDING NON-LINEAR IN PAINTING FOR VOIDS IN GEOSPATIAL MODEL FREQUENCY DOMAIN DATA AND RELATED METHODS

(75) Inventors: Mark Rahmes, Melbourne, FL (US);
Anthony O'Neil Smith, Gainesville, FL (US); Josef Allen, Melbourne, FL (US);
Adrian M. Peter, Gainesville, FL (US);
Emile Ganthier, Palm Bay, FL (US);
Edward Beadle, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 941 days.

(21) Appl. No.: 11/458,811

(22) Filed: Jul. 20, 2006

(65) Prior Publication Data

US 2008/0019571 A1  Jan. 24, 2008

(51) Int. Cl.
*G06K 9/00* (2006.01)
(52) U.S. Cl. .................. 382/109; 382/100; 382/191
(58) Field of Classification Search .............. 382/100, 382/103, 104, 106, 107, 108, 109, 155, 156, 382/181, 190, 195, 199, 201, 202, 203, 204; 702/1, 2, 5, 6, 11, 12, 14, 16; 701/200, 207, 701/208, 51, 55, 56
See application file for complete search history.

(56) References Cited

U.S. PATENT DOCUMENTS

| | | | | |
|---|---|---|---|---|
| 5,444,618 A | * | 8/1995 | Seki et al. ...................... | 702/5 |
| 5,671,136 A | * | 9/1997 | Willhoit, Jr. .................. | 702/18 |
| 6,104,981 A | * | 8/2000 | Louis et al. .................... | 702/5 |
| 6,128,580 A | * | 10/2000 | Thomsen ...................... | 702/18 |
| 6,512,857 B1 | * | 1/2003 | Hsu et al. ..................... | 382/294 |
| 6,654,690 B2 | | 11/2003 | Rahmes et al. ................. | 702/5 |
| 6,987,520 B2 | * | 1/2006 | Criminisi et al. ............. | 345/629 |
| 7,133,539 B2 | * | 11/2006 | Ohto .......................... | 382/113 |
| 2002/0026278 A1 | * | 2/2002 | Feldman et al. ............. | 701/117 |
| 2003/0184545 A1 | * | 10/2003 | Ohto .......................... | 345/419 |
| 2003/0225513 A1 | * | 12/2003 | Gagvani et al. ............. | 701/211 |
| 2004/0027344 A1 | * | 2/2004 | Ohto .......................... | 345/419 |
| 2004/0153128 A1 | | 8/2004 | Suresh et al. ................. | 607/14 |
| 2004/0164996 A1 | * | 8/2004 | Criminisi et al. ............ | 345/619 |

(Continued)

OTHER PUBLICATIONS

Beddhu, Murali et al., "Towards computations of ocean flows using Navier-Stokes equations", Conference on High Performance Networking and Computing archive, Proceedings of the 1994 ACM/IEEE conference on Supercomputing, p. 144-153, 1994.*

(Continued)

*Primary Examiner*—Andrew W Johns
*Assistant Examiner*—Tahmina Ansari
(74) *Attorney, Agent, or Firm*—Allen, Dyer, Doppelt, Milbrath & Gilchrist, P.A.

(57) ABSTRACT

A geospatial modeling system may include a geospatial model database and a processor. More particularly, the processor may cooperate with the geospatial model database for inpainting data into at least one void in geospatial model frequency domain data based upon propagating contour data from outside the at least one void into the at least one void, and for converting the geospatial model frequency domain data after inpainting into geospatial model spatial domain data.

22 Claims, 13 Drawing Sheets

U.S. PATENT DOCUMENTS

2006/0013442 A1     1/2006     McDowall et al. .......... 382/109
2006/0013443 A1     1/2006     McDowall et al. .......... 382/109
2008/0285885 A1*    11/2008   Rahmes et al. ............. 382/284

OTHER PUBLICATIONS

Mayunga et al., "Extraction of Buildings in Informal Settlement Areas From High-Resolution Data", ASPRS 2005 Annual Conference—Geospatial Goes Global—From Your Neighborhood to the Whole Planet—Mar. 7-11, 2005.*

Websters II New Riverside University Dictionary, Copyright 1988, p. 305.*

Miyawaki M et al., "The DEM Generation of a Yolcano Using Airborne SAR Interferometry", IGARSS 2002. IEEE 2002 International Geoscience and Remote Sensing Symposium, Toronto, Sweden, Jun. 24-28, 2002, [IEEE International Geoscience and Remote Sensing Symposium], New York, NY, IEEE, vol. 5,Jun. 24, 2002, pp. 2702-2704.

Stankwitz H C et al., "Sparse Aperture Fill for SAR Using Super-SVA" Radar Conference, 1996, Proceedings of the 1996 IEEE National Ann Arbor, MI, USA May 13-16, 1996, New York, NY, IEEE, May 13, 1996, pp. 70-75.

Kaup A et al., "Frequency Selective Signal Extrapolation With Applications to Error Concealment in Image Communication" AEU International Journal of Electronics and Communications, Elsevier, Jena, DE, vol. 59, No. 3, Jun. 9, 2005, pp. 147-156.

Chan T F et al., "Euler's Elastica and Curvature-Based Inpainting", S I A M Journal on Applied Mathematics, Society for Industrial and Applied Mathematics, vol. 63, No. 2, Jan. 1, 2003, pp. 564-592.

Gu J et al., "Metal Artifacts Reduction in CT Images Through Euler's Elastica and Curvature Based Sinogram Inpainting", Progress in Biomedical Optics and Imaging—Proceedings of SPIE—Medical Imaging 2006, Image Processing 2006 SPIE US, vol. 6144 III, Feb. 13, 2006.

Bertalmio M et al., "Image Inpainting" Computer Graphics, Siggraph 2000 Conference Proceedings, New Orleans, LA, Jul. 23-28, 2000, [Computer Graphics Proceedings, Siggraph], New York, NY, ACM, US, Jul. 23, 2000, pp. 417-424.

Bruzzone et al., *Recognition and Detection of Impact Craters from EO Products*, Department of Information and Communication Technology—University of Trento, 2004.

Vozikis, *Automated Generation and Updating of Digital City Models Using High-Resolution Line Scanning Systems*, 2004, International Archives of Photogrammetry, Remote Sensing and Spatial Information Sciences, vol. 35.

Maire et al., *Synergy of Image and Digital Elevation Models (DEMs) Information for Virtual Reality*, DLR German Aerospace Center.

Fisher et al., *Roberts Cross Edge Detector*, 1993, available at www.homepages.inf.ed.ac.uk/rbf/HIPR2/roberts.htm.

Fisher et al., *Hough Transform*, 1993, available at www.homepages.inf.ed.ac.uk/rbf/HIPR2/hough.htm.

Verdera et al., *Inpainting Surface Holes*, May 2, 2003.

Bertalmio et al., *Navier-Stokes, Fluid Dynamics, and Image and Video Inpainting*, Proceedings of the International Conference on Computer Vision and Pattern Recognition IEEE, 2001, vol. 1, pp. 355-362.

Reigber et al., *Interference Suppression in Synthesized SAR Images*, IEEE Geoscience and Remote Sensing Letters, vol. 2, No. 1, pp. 45-49, Jan. 2005.

Generating Contour Lines from 7.5 Min DEM Files, available at www.gis.usu.edu/Geography-Department/rsgis/howto/demgen/demgen.html.

Limp, *Raster GIS Packages Finally Receive Well-Deserved Recognition*, Geoworld, 2006.

* cited by examiner

GEOSPATIAL MODELING SYSTEM PROVIDING NON-LINEAR IN PAINTING FOR VOIDS IN GEOSPATIAL MODEL FREQUENCY DOMAIN DATA AND RELATED METHODS

FIELD OF THE INVENTION

The present invention relates to the field of topography, and, more particularly, to a system and related methods for generating topographical models.

BACKGROUND OF THE INVENTION

Topographical models of geographical areas may be used for many applications. For example, topographical models may be used in flight simulators and for planning military missions. Furthermore, topographical models of man-made structures (e.g., cities) may be extremely helpful in applications such as cellular antenna placement, urban planning, disaster preparedness and analysis, and mapping, for example.

Various types and methods for making topographical models are presently being used. One common topographical model is the digital elevation map (DEM). A DEM is a sampled matrix representation of a geographical area which may be generated in an automated fashion by a computer. In a DEM, coordinate points are made to correspond with a height value. DEMs are typically used for modeling terrain where the transitions between different elevations (e.g., valleys, mountains, etc.) are generally smooth from one to a next. That is, DEMs typically model terrain as a plurality of curved surfaces and any discontinuities therebetween are thus "smoothed" over. Thus, in a typical DEM no distinct objects are present on the terrain.

One particularly advantageous 3D site modeling product is RealSite® from the present Assignee Harris Corp. RealSite® may be used to register overlapping images of a geographical area of interest, and extract high resolution DEMs using stereo and nadir view techniques. RealSite® provides a semi-automated process for making three-dimensional (3D) topographical models of geographical areas, including cities, that have accurate textures and structure boundaries. Moreover, RealSite® models are geospatially accurate. That is, the location of any given point within the model corresponds to an actual location in the geographical area with very high accuracy The data used to generate RealSite® models may include aerial and satellite photography, electro-optical, infrared, and light detection and ranging (LIDAR).

Another advantageous approach for generating 3D site models is set forth in U.S. Pat. No. 6,654,690 to Rahmes et al., which is also assigned to the present Assignee and is hereby incorporated herein in its entirety by reference. This patent discloses an automated method for making a topographical model of an area including terrain and buildings thereon based upon randomly spaced data of elevation versus position. The method includes processing the randomly spaced data to generate gridded data of elevation versus position conforming to a predetermined position grid, processing the gridded data to distinguish building data from terrain data, and performing polygon extraction for the building data to make the topographical model of the area including terrain and buildings thereon.

While the above-noted approaches provide exceptional 3D models of urban areas with accurate and realistic cultural (e.g., building) feature detail, in some applications it may be desirable to produce a topographical model of a geographical area of interest without the cultural features otherwise present in the area of interest. Yet, once the cultural features are identified and extracted from the terrain data, there may be voids left in the resulting DEM. Moreover, in some situations it may be desirable to focus on cultural features from an area of interest, but foliage, etc., may obscure portions of one or more cultural features that will similarly result in voids in the cultural feature when the foliage is extracted.

Various interpolation techniques are generally used for filling in missing data in a data field. One such technique is sinc interpolation, which assumes that a signal is band-limited. While this approach is well suited for communication and audio signals, it may not be well suited for 3D data models. Another approach is polynomial interpolation. This approach is sometimes difficult to implement because the computational overhead may become overly burdensome for higher order polynomials, which may be necessary to provide desired accuracy.

One additional interpolation approach is spline interpolation. While this approach may provide a relatively high reconstruction accuracy, this approach may be problematic to implement in a 3D data model because of the difficultly in solving a global spline over the entire model, and because the required matrices may be ill-conditioned. One further drawback of such conventional techniques is that they tend to blur edge content, which may be a significant problem in a 3D topographical model.

Another approach for filling in regions within an image is set forth in U.S. Pat. No. 6,987,520 to Criminisi et al. This patent discloses an examplar-based filling system which identifies appropriate filling material to replace a destination region in an image and fills the destination region using this material. This is done to alleviate or minimize the amount of manual editing required to fill a destination region in an image. Tiles of image data are "borrowed" from the proximity of the destination region or some other source to generate new image data to fill in the region. Destination regions may be designated by user input (e.g., selection of an image region by a user) or by other means (e.g., specification of a color or feature to be replaced). In addition, the order in which the destination region is filled by example tiles may be configured to emphasize the continuity of linear structures and composite textures using a type of isophote-driven image-sampling process.

Another way in which geospatial model data can end up with voids therein is when the data is collected in the frequency domain, as is the case with Synthetic Aperture Radar (SAR) data collection. That is, a SAR returns a map or representation of radar reflectivity including both amplitude and phase over a plurality of different frequencies. However, due to interference from existing signal sources, during some SAR scans certain frequency bands may experience interference in the resulting SAR data. Moreover, the operator of the SAR may have to intentionally omit or block certain frequency bands in certain geographical areas from the scan to avoid interfering with such communication sources. Further, hardware malfunctions may result in pulse dropouts. In each of these cases, the result is that the frequency domain representation of the area of interest will have gaps or voids therein, which when converted to the spatial domain cause the resulting geospatial model image to be distorted.

Generally speaking, various approaches have been used to address the effects of interference in frequency domain data. One approach is to use linear interpolation. Super resolution and/or iterative convolution techniques have also been used which assume a point like target in the image. Moreover, hardware approaches have also been implemented to alter mode hopping to avoid interference or listening on pilot pulses to characterize the interference.

Another approach to interference suppression in SAP images is set forth in an article entitled "Interference Suppression in Synthesized SAR Images" by Reigber et al., IEEE Geoscience and Remote Sensing Letters, vol. 2, no. 1, January 2005. This article proposes an interference suppression approach that relies on the transformation of synthesized SAR images into a representation where common raw-data interference filtering methods can be applied. More particularly, this approach uses a posteriori filtering.

Despite the advantages such prior art approaches may provide in certain applications, further advancements may be desirable for filling voids in geospatial model data.

SUMMARY OF THE INVENTION

In view of the foregoing background, the present disclosure presents a geospatial modeling system and related methods which may advantageously fill voids within geospatial model data and related methods.

This and other objects, features, and advantages are provided by a geospatial modeling system which may include a geospatial model database and a processor. More particularly, the processor may cooperate with the geospatial model database for inpainting data into at least one void in geospatial model frequency domain data based upon propagating contour data from outside the at least one void into the at least one void, and for converting the geospatial model frequency domain data after inpainting into geospatial model spatial domain data.

More particularly, the processor may inpaint by propagating contour data from outside the at least one void along a direction of lines of constant contour from outside the at least one void into the at least one void. Moreover, the processor may iteratively propagate the contour data from outside the at least one void into the at least one void. The contour data may include at least one of phase and amplitude data.

By way of example, the geospatial frequency domain data may be Synthetic Aperture Radar (SAR) data, seismic data, Sound Navigation and Ranging (SONAR) data, etc. Furthermore, the processor may perform inpainting based upon at least one turbulent fluid flow modeling equation. More particularly, the at least one turbulent fluid flow modeling equation may be Navier-Stokes equations. The geospatial modeling system may further include a display coupled to the processor for displaying the geospatial model spatial domain data A geospatial modeling method may include providing geospatial model frequency domain data, and inpainting data into at least one void in the geospatial model frequency domain data based upon propagating contour data from outside the at least one void into the at least one void. The method may further include converting the geospatial model frequency domain data after inpainting into geospatial model spatial domain data.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation are used to indicate similar elements in alternative embodiments.

Figure 1:
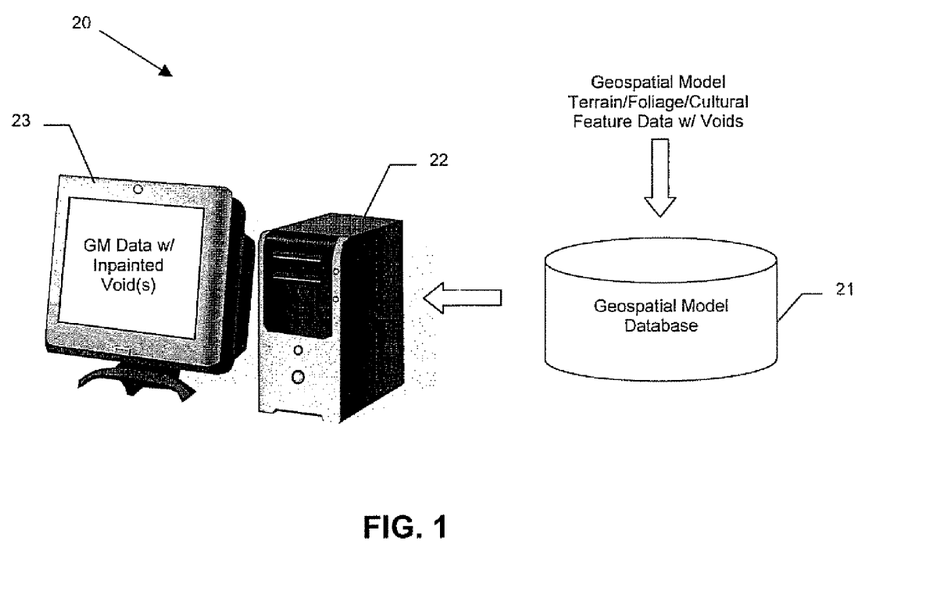
FIG. 1 is a schematic block diagram of a geospatial modeling system in accordance with the invention.

Referring initially to FIG. 1, a geospatial modeling system 20 illustratively includes a geospatial model database 21 and a processor 22, such as a central processing unit (CPU) of a PC, Mac, or other computing workstation, for example. A display 23 may be coupled to the processor 22 for displaying geospatial modeling data, as will be discussed further below.

Figure 2:
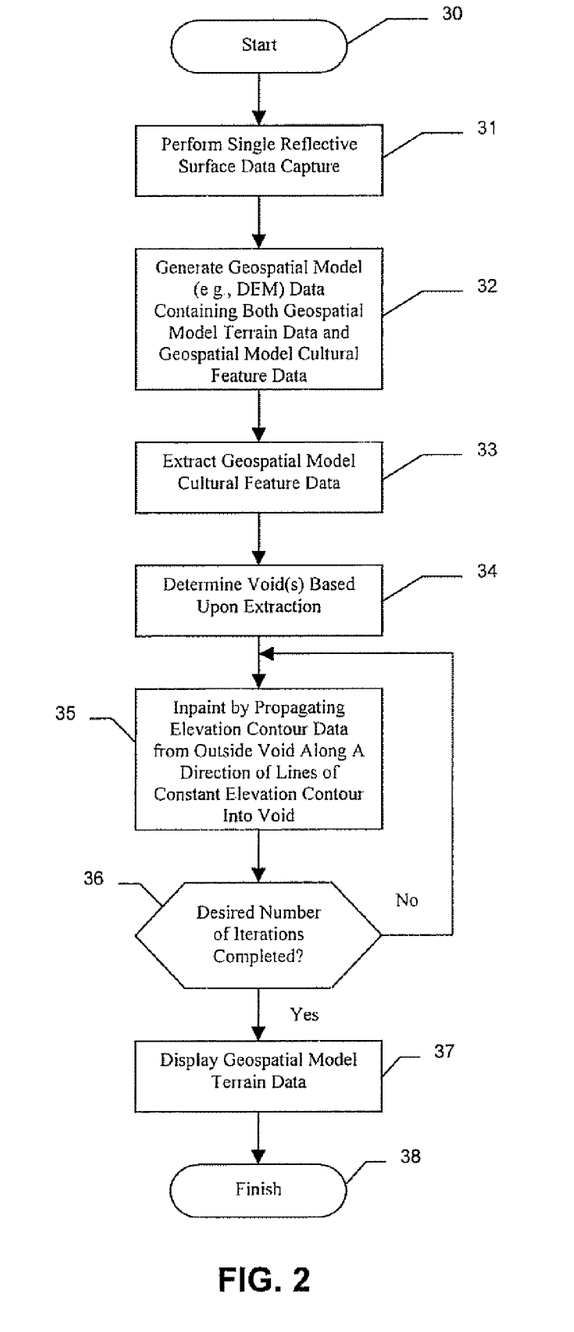
FIG. 2 is a flow diagram illustrating a geospatial modeling method aspect for void inpainting within geospatial model terrain data in accordance with the invention.
Figure 3A:
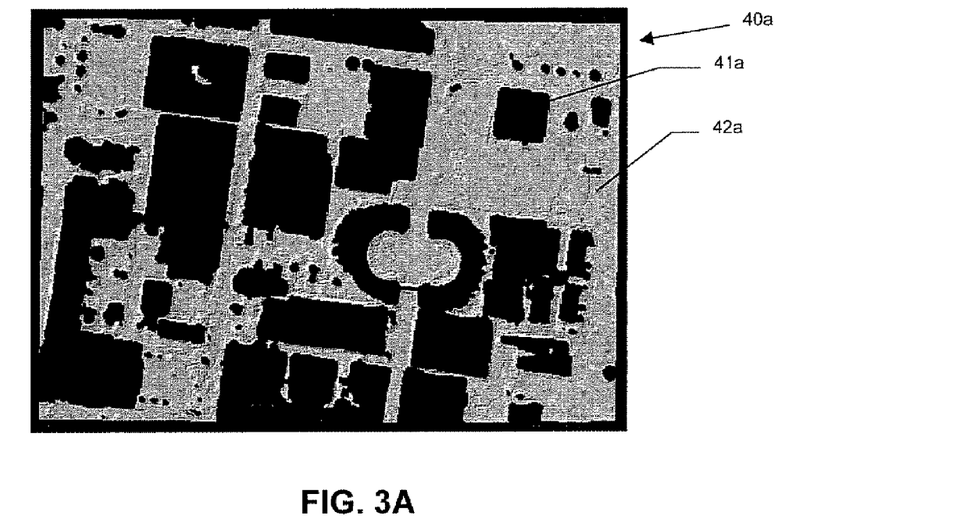
FIGS. 3A-3B are nadir views of geospatial model terrain data in a DEN before and after void inpainting in accordance with the invention.
Figure 3B:
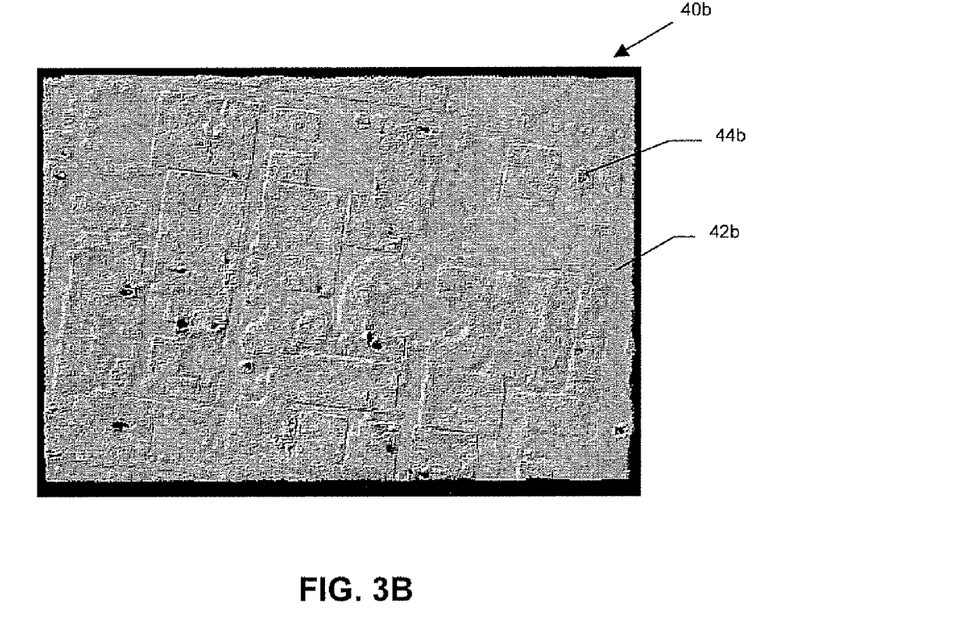

Turning additionally to FIGS. 2-4, an approach for inpainting data into one or more voids in geospatial model terrain data is now described. Beginning at Block 30, one or more data captures are performed for the geographical area of interest to obtain 3D elevation versus position data. The data capture may be performed using various techniques, such as stereo optical imagery, Light Detecting And Ranging (LIDAR), Interferometric Synthetic Aperture Radar (IFSAR), etc. Generally speaking, the data will be captured from nadir views of the geographical area of interest by airplanes, satellites, etc., as will be appreciated by those skilled in the art. However, oblique images of a geographical area of interest may also be used in addition to or instead of the images to add additional 3D detail to a geospatial model.

In the illustrated example, a single reflective surface data capture is performed to provide the 3D data of the geographical area of interest, at Block 31. The "raw" data provided from the collection will typically include terrain, foliage, and/or cultural features (e.g., buildings). The processor 22 uses this raw data to generate a geospatial model (i.e., DEM) of the elevation verses position data based upon the known position of the collectors, etc., at Block 32, using various approaches which are known to those skilled in the art. Of course, in other embodiments the DEM may be generated by another computer and stored in the geospatial model database 21 for processing by the processor 22. The DEM data may have a relatively high resolution, for example, of greater than about thirty meters to provide highly accurate image detail, although lower resolutions may be used for some embodiments, if desired. In some embodiments, resolutions of one meter or better may be achieved.

In many instances it is desirable to separate or extract one of the above-noted types of data from a geospatial model. For example, in some cases it may be desirable to remove the cultural features from a DEM so that only the terrain and/or foliage remains, at Block 33. In particular, the extraction process may include a series of DEM re-sampling, null filling, DEM subtraction, and null expanding steps, as will be appreciated by those skilled in the art. Yet, extracting the cultural features would ordinarily leave holes or voids within the DEM. A DEM 40a is shown in FIGS. 3A and 3B in which voids 41a appear in terrain 42a where buildings have been extracted.

When features have been extracted from the geospatial model, this makes determination of voids to be filled (Block 34) relatively straightforward, as these voids will occur where the cultural feature or other data has been extracted. However, in some embodiments the voids may result from causes other than data extraction, such as a blind spot of a collector, clouds over a geographical area or interest, etc. The approach described herein may also be used to correct such voids as well.

Figure 4A:
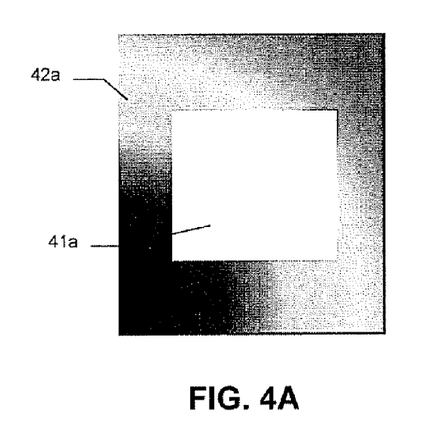
FIGS. 4A-4D are a series of close-up views of a void in geospatial model terrain data illustrating the inpainting technique used in FIGS. 3A and 3B in greater detail.
Figure 4B:
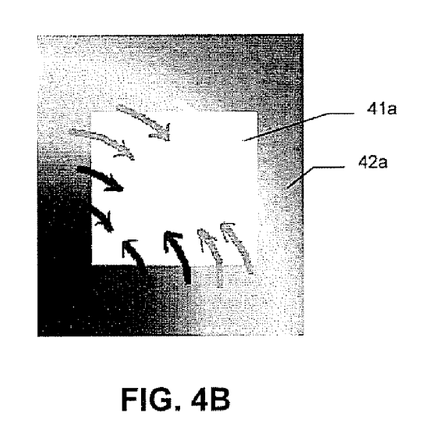
Figure 4C:
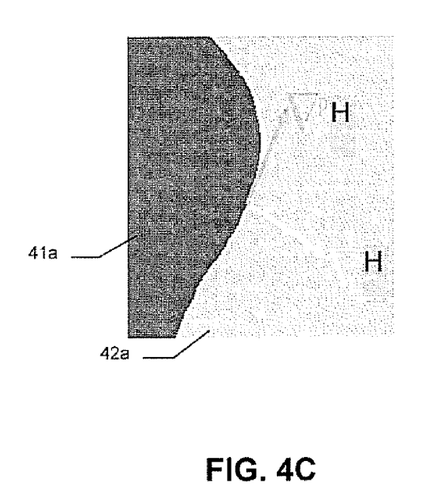

Generally speaking, the voids 41a are inpainted by propagating contour data from outside a given void into the given void, at Block 35. More particularly, the processor 22 inpaints by propagating elevation contour data from outside the given void along a direction of lines of constant elevation contour from outside the given void into the void, as seen in FIGS. 4A-4D. More particularly, the lines of constant elevation contour may be based upon isophote ($\nabla^P H$) and gradient ($\nabla H$) directions at given points along the void boundary, as shown in FIG. 4C. As will be appreciated by those skilled in the art, inpainting is a non-linear interpolation technique which in the present example is used to propagate the data from the area around a void created by an extracted building to "fill" the void.

More particularly, the processor 22 propagates elevation information from outside the void along a direction of iso-contour, as represented by the following equation:

$$\frac{\partial I}{\partial t} = \nabla L \cdot N, \quad (1)$$

where $\nabla L$ is a discrete Laplacian transform. An iso-contour direction N is obtained by taking a 90 degree rotation of the DEM gradient, as will be appreciated by those skilled in the art. An inpainting equation for performing the above-noted propagation is as follows:

$$H^{n+1}(i,j) = H^n(i,j) + \Delta t H_1^n(i,j), \forall (i,j) \in \Omega. \quad (2)$$

Figure 4D:
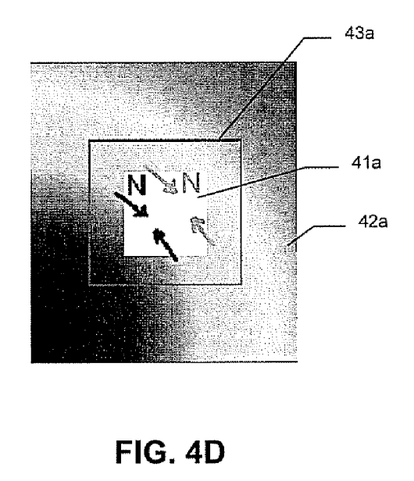

The above-noted propagation is performed a certain number of iterations to "shrink" the void to a desired size as seen in FIG. 4D The starting boundary 43a of the void is shown in FIG. 4D so that the amount of propagation from one iteration may be seen. After the desired number of iterations are performed, at Block 36, then the final geospatial model terrain data 40b may be displayed on the display 23, at Block 37, thus concluding the illustrated method (Block 38). In the present example, 4000 iterations of propagation were used for inpainting the voids 41a in the geospatial model terrain data, but more or less numbers of iterations may be used in different embodiments depending upon the required accuracy and the computational overhead associated therewith.

Generally speaking, the above-described approach essentially treats a DEM as an incompressible fluid, which allows fluid mechanics techniques to be used for filling in the voids. That is, the partial differential equations outlined above are used to estimate how the boundaries directly adjacent a void in the 3D model would naturally flow into and fill the void if the DEM were considered to be an incompressible fluid, as will be appreciated by those skilled in the art.

This approach advantageously allows for autonomous reconstruction of bare earth in places where buildings or other cultural features have been removed, yet while still retaining continuous elevation contours. Moreover, the non-linear interpolation technique of inpainting allows for accurate propagation of data from the area surrounding a void boundary Further, the DEM may advantageously be iteratively evolved until a steady state is achieved, and the speed of propagation may be controlled to provide a desired tradeoff between accuracy of the resulting geospatial data and the speed so that the processing overhead burden does not become undesirably large, as will be appreciated by those skilled in the art.

Figure 5:
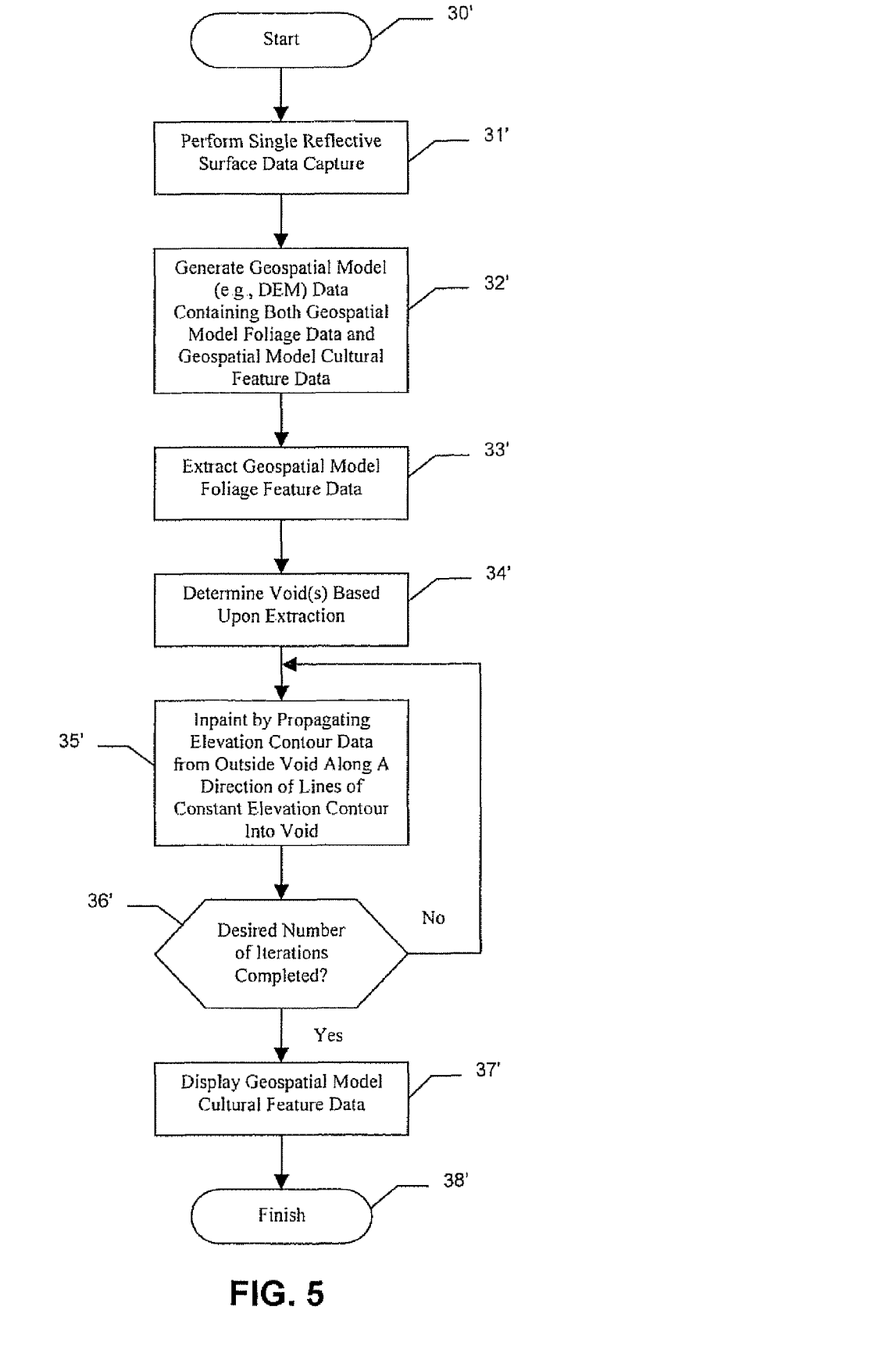
FIG. 5 is a flow diagram illustrating an alternative geospatial modeling method aspect for void inpainting within geospatial model cultural feature data in accordance with the invention
Figure 6:
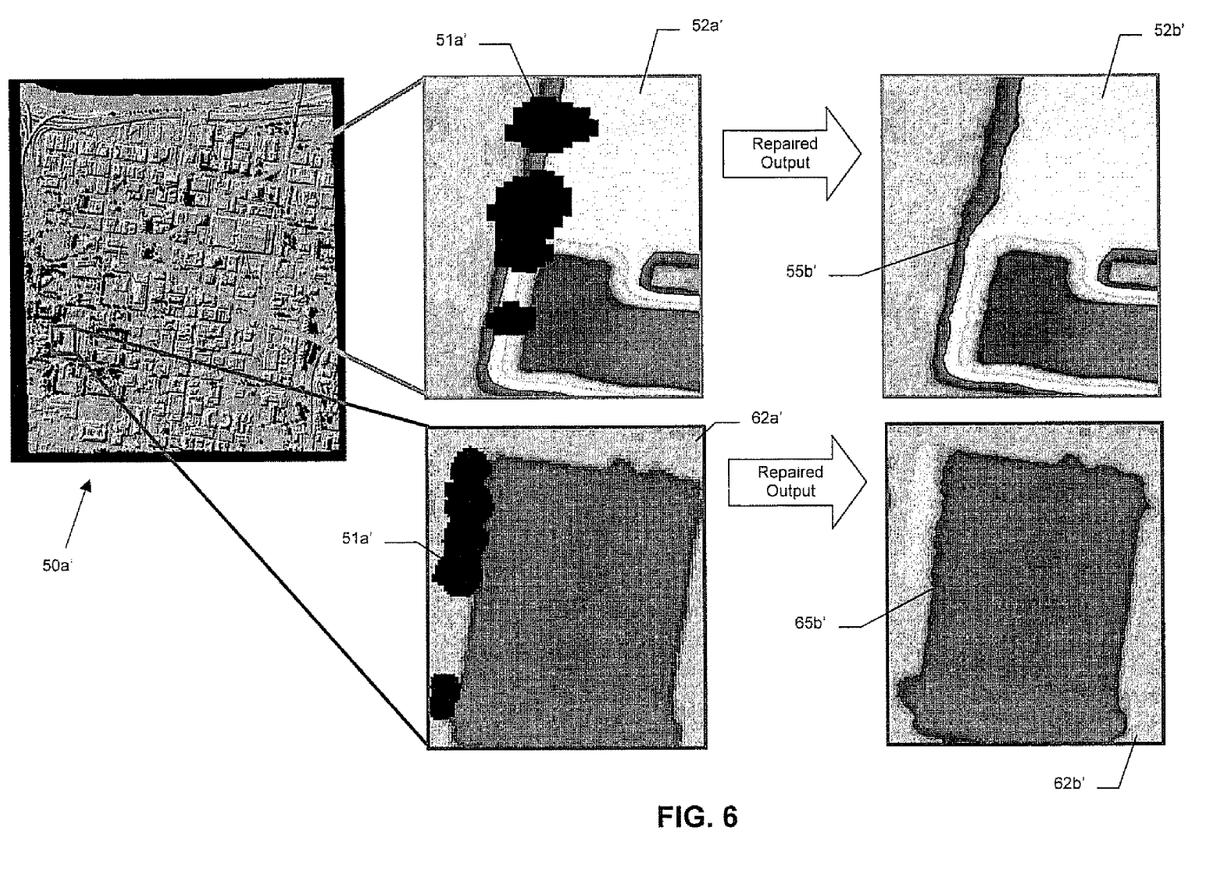
FIG. 6 is a view of geospatial model cultural feature data in a DEM before and after void inpainting in accordance with the method illustrated in FIG. 5.

The above-described approach may similarly be used to reconstruct other features besides terrain. More particularly, it may be used to perform inpainting on voids in a cultural feature (e.g., building) resulting from foliage, etc., that obscures part of the cultural feature. Turning now additionally to FIGS. 5-7, the processor 22 may cooperate with the geospatial model database 21 for inpainting data into one or more voids 51a in geospatial model cultural feature data 50a caused by the extraction of foliage (i.e., tree) data from the DEM, at Block 33'. By way of example, the foliage extraction may be performed based upon the color of the data (if color data is provided), as well as the color gradient of the data, as will be appreciated by those skilled in the art. Of course, other suitable foliage extraction techniques may also be used. Once again, the voids 51a may be determined based upon the location of the foliage that is extracted.

Figure 7A:
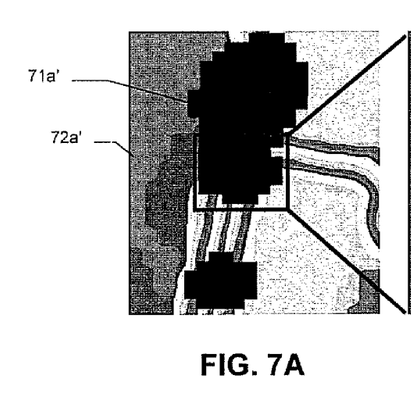
FIGS. 7A-7D are a series of close-up views of a void in geospatial model cultural feature data illustrating the inpainting technique used in FIG. 6 in greater detail.
Figure 7B:
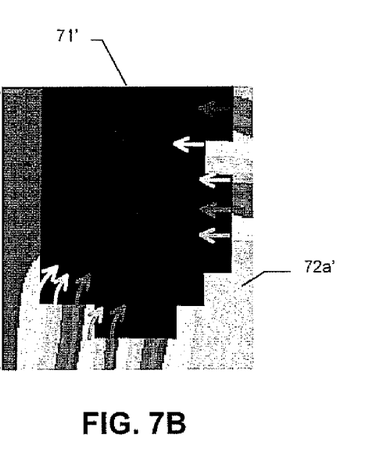
Figure 7C:
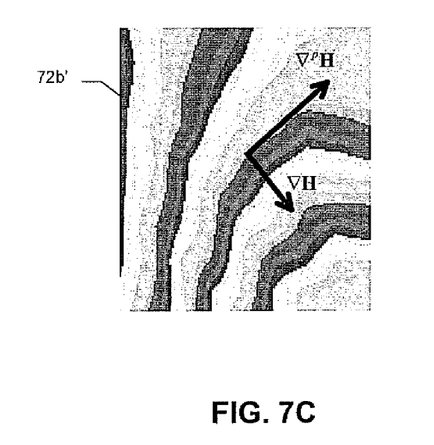
Figure 7D:
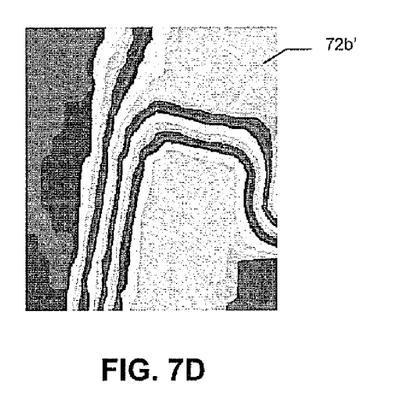
Figure 8:
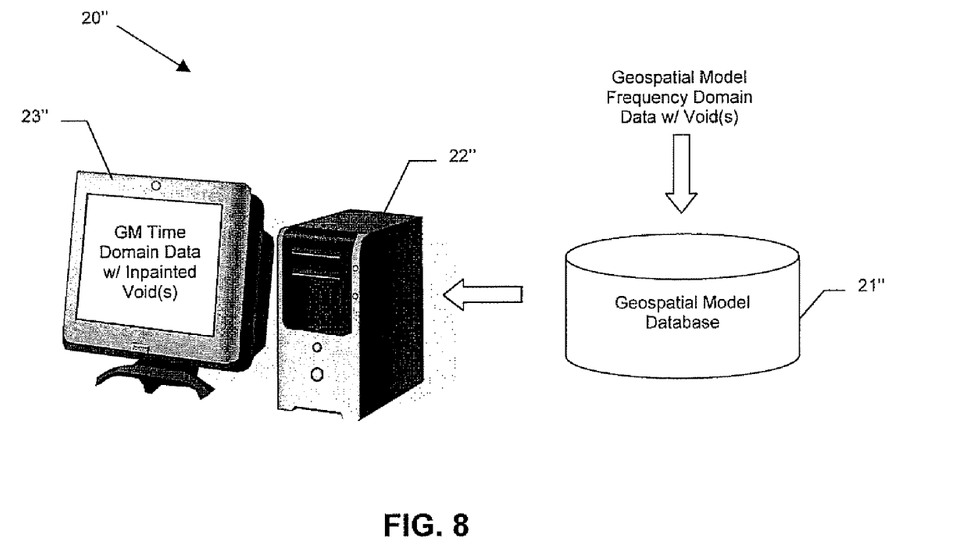
FIG. 8 is a schematic block diagram of an alternative geospatial modeling system in accordance with the invention for void inpainting within geospatial model frequency domain data.

As discussed above, the processor 22 inpaints by iteratively propagating elevation contour data from outside the voids 51a in data portions 52a, 62a along a direction of lines of constant elevation contour from outside the voids into the voids, at Blocks 35'-36', to produce the final "repaired" data portions 52b, 62b in which building edges 55b', 65b' are now complete and continuous. The inpainting process is further illustrated in FIGS. 7A-7D, in which elevation information (as visually represented by the different shading) from the bordering region of a data portion 72a around a void 71 is propagated into the void (FIGS. 7A and 7B) based upon the following relationship:

$$\frac{\partial H}{\partial t} = \nabla L \cdot N, \quad (3)$$

where ∇H is the DEM gradient and ∇^P H is the iso-contour direction to produce the repaired data section 72b (FIGS. 7C and 7D). Here again, the above-noted equation (2) may be used. This approach advantageously allows for the autonomous creation of high resolution DEMs of cultural features (e.g., buildings). Moreover, this may be done while maintaining building elevation consistency and edge sharpness of the identified inpainted regions.

Turning additionally to FIGS. 8 through 13, yet another system 20" for geospatial model frequency domain data to void inpainting is now described. Here again, the system 20" illustratively includes a geospatial model database 21", a processor 22", and a display 23" coupled to the processor, which may be similar to the above-described components. However, in this embodiment the geospatial model database 21" stores geospatial model frequency domain data for processing by the processor 22"'. By way of example, the frequency domain data may be captured using a SAR, SONAR, or seismic collection device, for example, as will be appreciated by those skilled in the art, at Blocks 80-81. The example that will be discussed below with reference to FIGS. 10-13 is based upon SAR frequency domain data.

Figure 10:
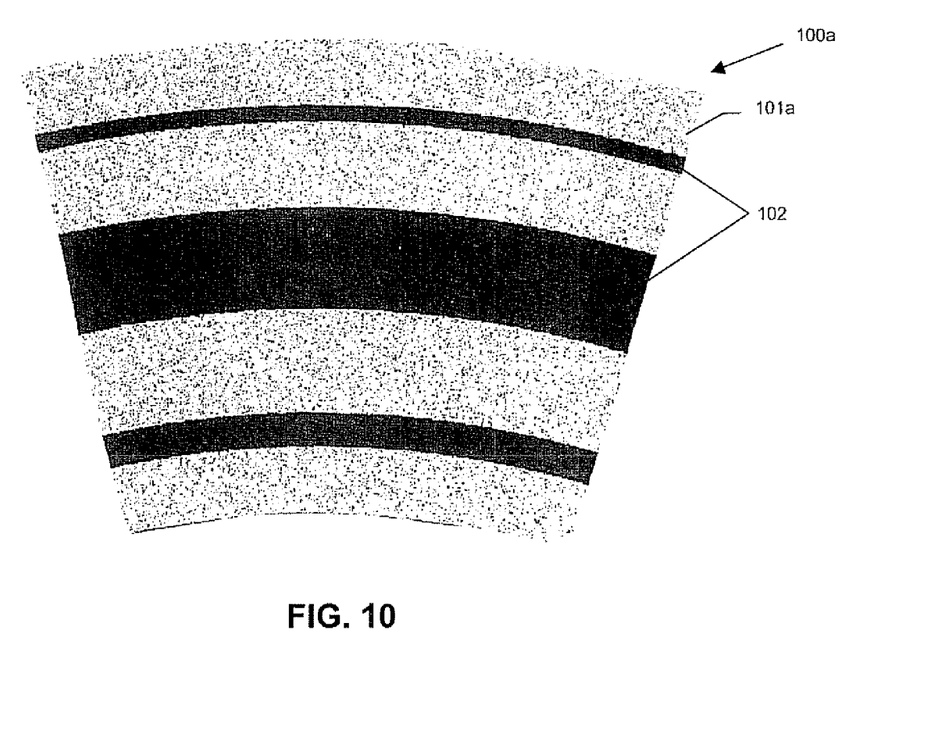
FIG. 10 is a K-space frequency domain representation of the U.S. Capitol building from a SAR with voids therein.
Figure 11:
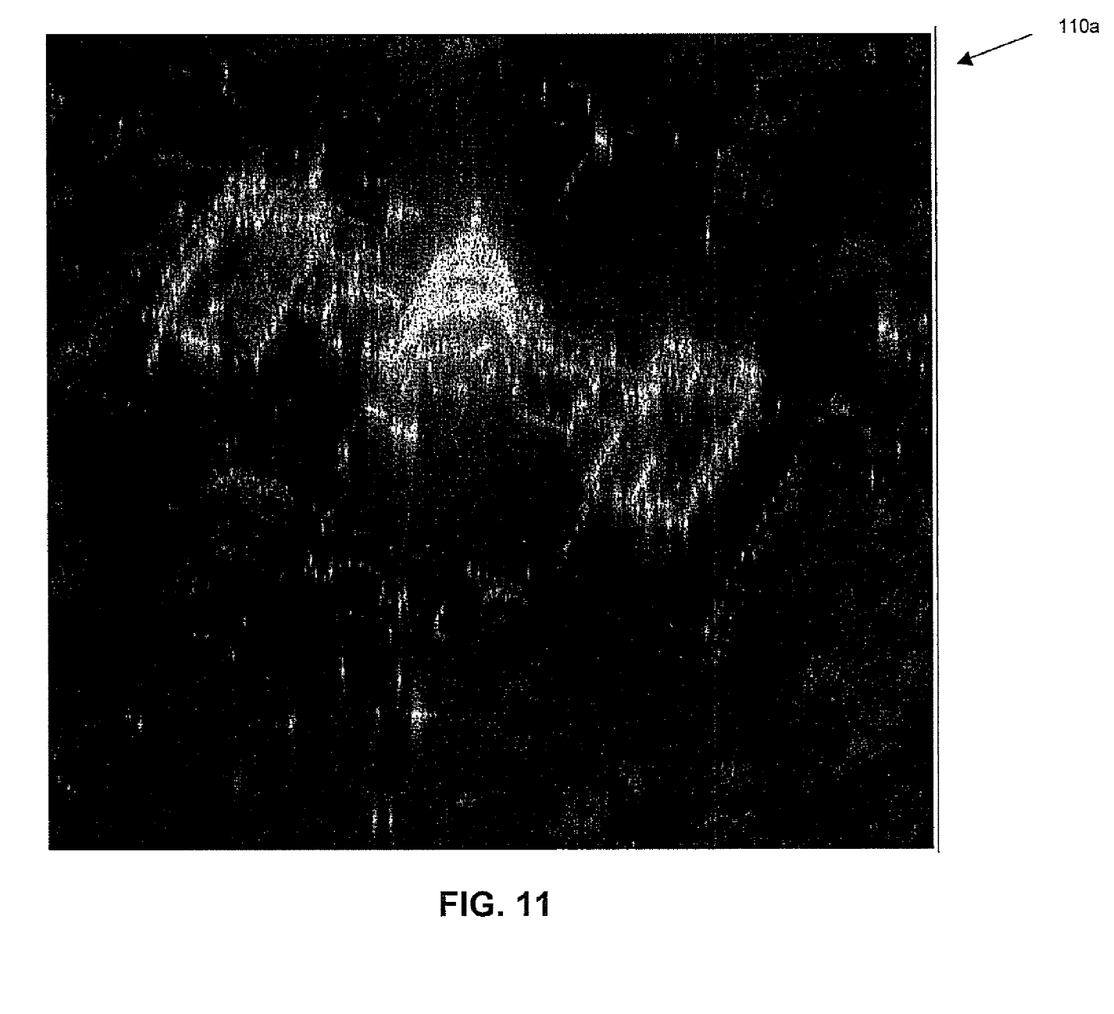
FIG. 11 is a time spatial equivalent image of the frequency domain data of FIG. 10.

More particularly, a frequency domain data map 100 illustrated in FIG. 10 is a K-apace representation of phase/amplitude data 101 from a SAR scan of the U.S. Capitol building For purposes of the present example, certain bands 102 of phase/amplitude data have been removed from the phase map to represent the effects of missing frequency data. More particularly, such missing data bands 102 typically result from the notching of particular frequencies to avoid interference with other RF emitters, from hardware malfunctions that result in pulse dropouts, RF interference, etc. It should be noted that in the present example the bands 102 have been manually removed for illustrational purposes, and are not the result of notching, hardware malfunction, etc. The missing data bands 102 may therefore be treated as voids in the frequency domain data representation. The result of these voids is a blurred or distorted spatial domain representation of the SAR data 110a when converted to the spatial domain, as shown in FIG. 11. That is, the voids result in a degraded spatial domain image with a high multiplicative noise ratio (MNR), as will be appreciated by those skilled in the art.

Figure 9:
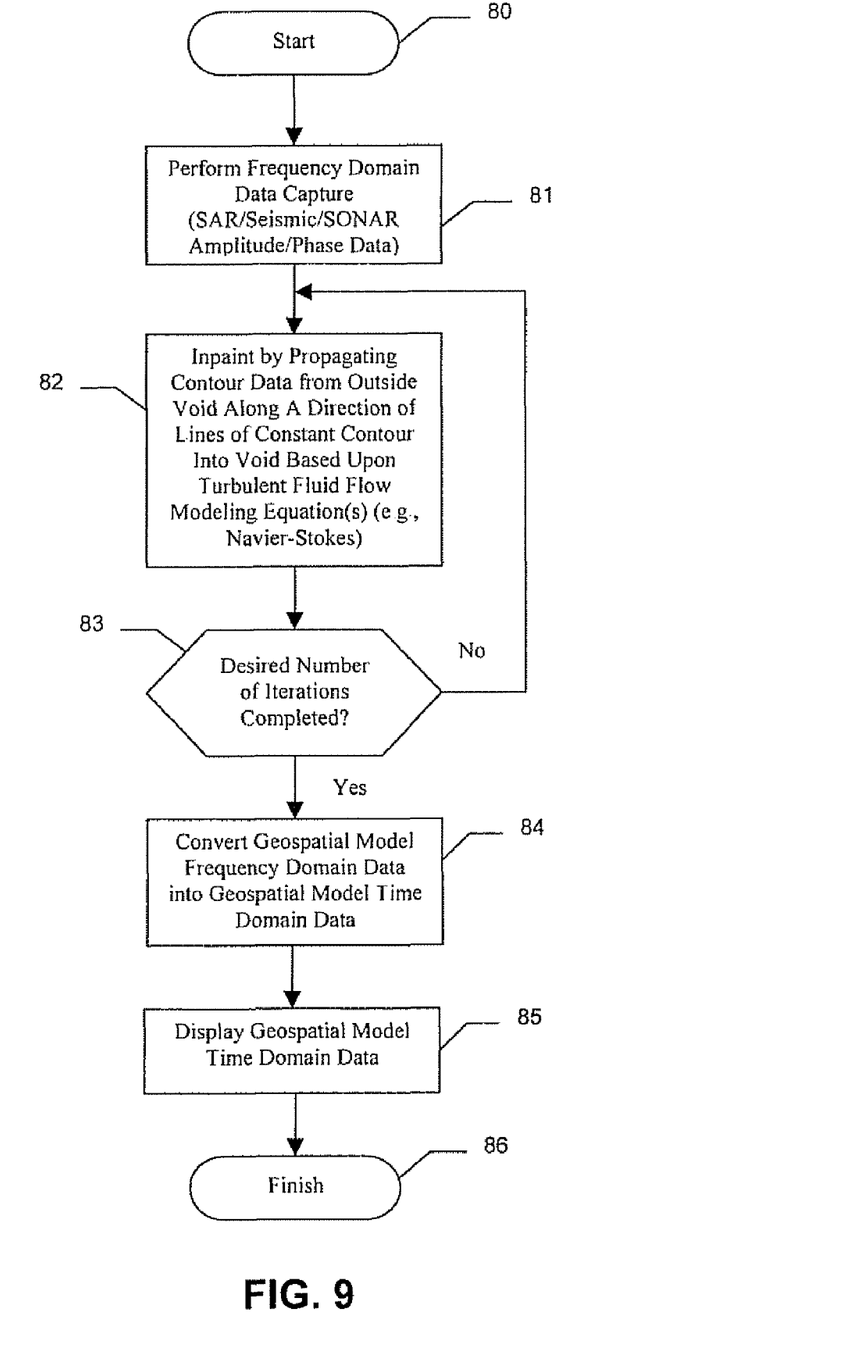
FIG. 9 is a flow diagram illustrating an alternative geospatial modeling method aspect of the invention for void inpainting within geospatial model frequency domain data.

However, the above-described inpainting techniques may also advantageously be used for repairing such voids in geographical model frequency domain data. More particularly, the processor 22" cooperates with the geospatial model database 21" for inpainting data into the missing data bands 102 (i.e., voids) based upon propagating contour data from outside the voids into the voids, at Block 82. More particularly, the propagation occurs along a direction of lines of constant contour from outside the voids into the voids. Yet, rather than being based on elevation contour data as in the above-described examples, here the contour data corresponds to the phase and amplitude values of the data surrounding the voids. Here again, the propagation is preferably iteratively performed a desired number of iterations (Block 83), or until a steady state is achieved, as will be appreciated by those skilled in the art.

Once again, this approach is based upon reconstructing data for frequencies that are missing from a frequency domain representation of a geographical area of interest by modeling the spectral signatures that are present in the data surrounding the voids as a turbulent (i.e., fluid) flow. That is, each individual known frequency is treated as a particle in an eddy flow, which are small turbulence fields inside of a general turbulence field. As such, the known "eddies" in the frequency domain data can therefore be modeled to interpolate the missing values.

Generally speaking, the processor 22" performs inpainting based upon one or more turbulent fluid flow modeling equations. By way of example, Navier-Stokes fluid mechanics equations/relationships may be used with some modification for K-space. More particularly, the stream function will have two components rather than one as follows:

$$\Psi = A(k_x, k_y) e^{-\phi(k_x, k_y)} = R(k_x, k_y) + zQ(k_x, k_y), \quad (4)$$

where the functions A, R, and Q are four times differentiable, and $z = \sqrt{-1}$. Thus, looking at the derived equations with respect to image intensities results in the following:

$$\frac{\partial}{\partial t}(\nabla^2 \Psi) + (v \cdot \nabla)(\nabla^2 \Psi) = \nu \nabla^2 \cdot (\nabla^2 \Psi). \quad (5)$$

A similar Navier-Stokes approach may also be used for the terrain/cultural feature void inpainting operations described above, as will be appreciated by those skilled in the art.

Figure 12:
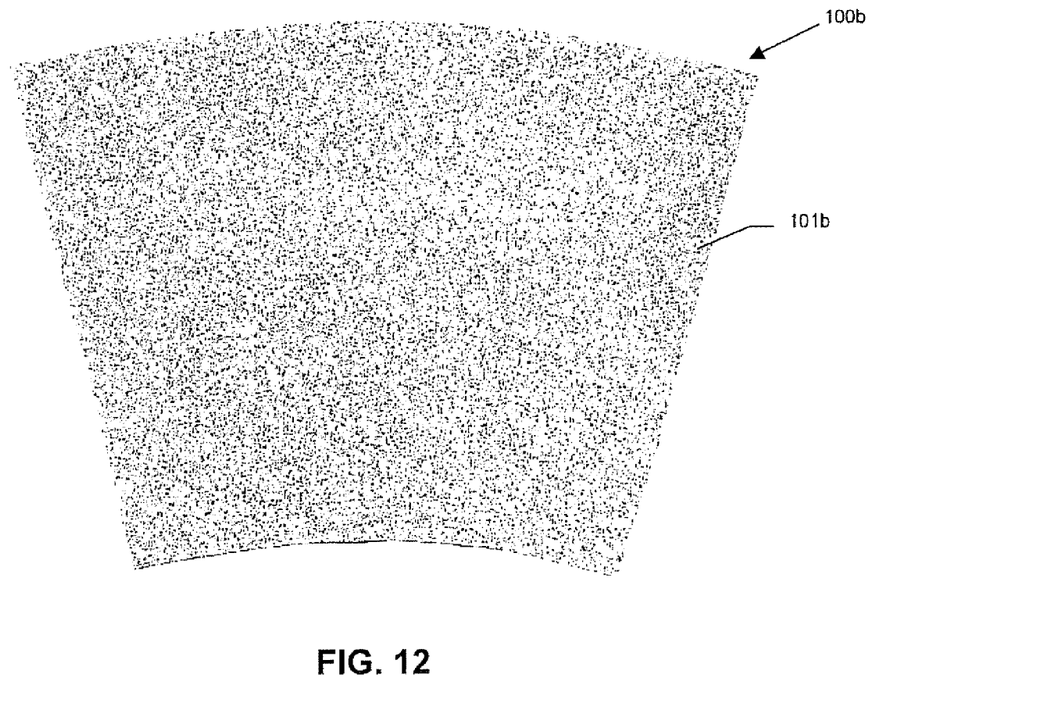
FIG. 12 is an representation of the K-space frequency domain data of FIG. 10 as it would appear after void inpainting in accordance with the method shown in FIG. 9.
Figure 13:
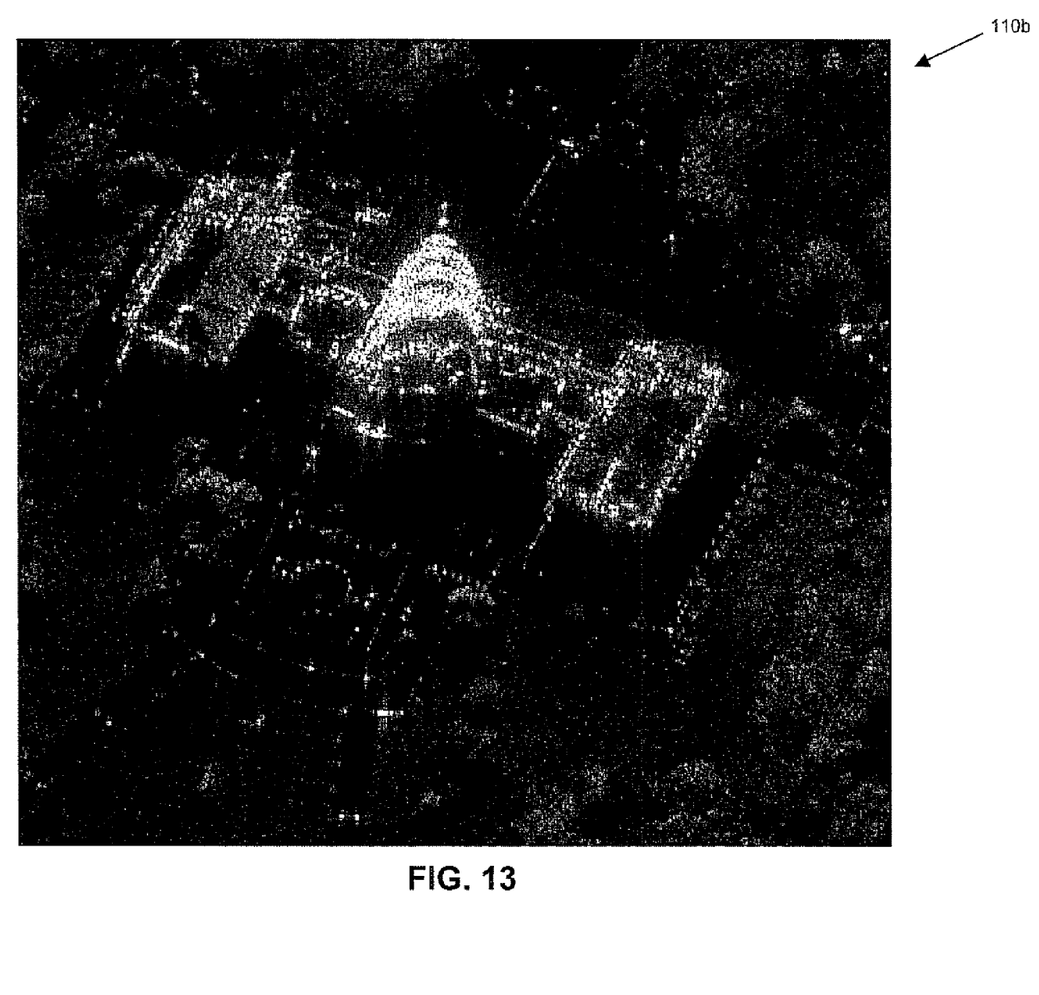
FIG. 13 is a spatial domain equivalent image of the frequency domain representation of FIG. 12.

After the iterative propagation is completed using the above-described approach, the K-space map 100b is "repaired" with the missing data bands 102a no longer present (or substantially diminished), as shown in FIG. 12, which when converted to the spatial domain (Block 84) provides the substantially less distorted spatial domain image of the Capital 110b shown in FIG. 13. Here again, it should be noted that the representation in FIG. 12 has not actually been repaired using inpainting techniques as described above; rather, this is an actual K-space representation of the Capitol building without any voids therein. However, applicants theorize that using the above-described approach will provide a close approximation of the representation 110b of FIG. 13, as will be appreciated by those skilled in the art. Once the inpainting is complete, the geospatial model spatial domain data may be displayed on the display 23", if desired, at Block 85, and/or stored in the geospatial model database 21", etc., thus concluding the illustrated method (Block 86).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A geospatial modeling system comprising:
   a geospatial model database; and
   a processor cooperating with said geospatial model database and configured for
      inpainting data into at least one void in geospatial model frequency domain data to replace missing data points within the at least one void based upon propagating contour data from outside the at least one void into the at least one void, and
      converting the geospatial model frequency domain data after inpainting into three-dimensional (3D) geospatial model spatial domain data.

2. The geospatial modeling system of claim 1 wherein said processor is configured to inpaint by propagating contour data from outside the at least one void along a direction of lines of constant contour from outside the at least one void into the at least one void.

3. The geospatial modeling system of claim 1 wherein said processor is configured to iteratively propagate the contour data from outside the at least one void into the at least one void.

4. The geospatial modeling system of claim 1 wherein the contour data comprises at least one of phase and amplitude data.

5. The geospatial modeling system of claim 1 wherein the geospatial frequency domain data comprises seismic data.

6. The geospatial modeling system of claim 1 wherein said processor is configured to perform inpainting based upon at least one turbulent fluid flow modeling equation.

7. The geospatial modeling system of claim 6 wherein the at least one turbulent fluid flow modeling equation comprises Navier-Stokes equations.

8. The geospatial modeling system of claim 1 further comprising a display coupled to said processor and configured for displaying the geospatial model spatial domain data.

9. A geospatial modeling system comprising:
a geospatial model database; and
a processor cooperating with said geospatial model database and configured for
inpainting data into at least one void in geospatial model frequency domain data to replace missing data points within the at least one void based upon iteratively propagating contour data along a direction of lines of constant contour from outside the at least one void into the at least one void, and
converting the geospatial model frequency domain data after inpainting into three-dimensional (3D) geospatial model spatial domain data.

10. The geospatial modeling system of claim 9 wherein the contour data comprises at least one of phase and amplitude data.

11. The geospatial modeling system of claim 9 wherein said processor is configured to perform inpainting based upon at least one turbulent fluid flow modeling equation.

12. The geospatial modeling system of claim 11 wherein the at least one turbulent fluid flow modeling equation comprises Navier-Stokes equations.

13. A geospatial modeling method comprising: providing geospatial model frequency domain data; using a processor to inpaint data into at least one void in the geospatial model frequency domain data to replace missing data points within the at least one void based upon propagating contour data from outside the at least one void into the at least one void; and converting the geospatial model frequency domain data after inpainting into three-dimensional (3D) geospatial model spatial domain data.

14. The method of claim 13 wherein inpainting comprises propagating contour data from outside the at least one void along a direction of lines of constant contour from outside the at least one void into the at least one void.

15. The method of claim 13 wherein inpainting comprises iteratively propagating the contour data from outside the at least one void into the at least one void.

16. The method of claim 13 wherein the contour data comprises at least one of phase and amplitude data.

17. The method of claim 13 wherein inpainting comprises propagating the contour data from outside the at least one void into the at least one void based upon at least one turbulent fluid flow modeling equation.

18. The method of claim 17 wherein the at least one turbulent fluid flow modeling equation comprises Navies-Stokes equations.

19. A non-transitory computer-readable medium having computer-executable modules comprising:
a geospatial model database module for storing geospatial model frequency domain data; and
a processing module for
inpainting data into at least one void in the geospatial model frequency domain data to replace missing data points within the at least one void based upon propagating contour data from outside the at least one void into the at least one void, and
converting the geospatial model frequency domain data after inpainting into three-dimensional (3D) geospatial model spatial domain data.

20. The computer-readable medium of claim 19 wherein the processing module propagates contour data from outside the at least one void along a direction of lines of constant contour from outside the at least one void into the at least one void.

21. The computer-readable medium of claim 19 wherein the processing module iteratively propagates the contour data from outside the at least one void into the at least one void.

22. The computer-readable medium of claim 19 wherein the contour data comprises at least one of phase and amplitude data.

* * * * *